United States Patent [19]
Kouthoofd

[11] Patent Number: 5,724,191
[45] Date of Patent: Mar. 3, 1998

[54] ENLARGING LENS WITH A LARGE WORKING DISTANCE

[75] Inventor: Barbara J. Kouthoofd, Rochester, N.Y.

[73] Assignee: Eastman Kodak Company, Rochester, N.Y.

[21] Appl. No.: 366,527

[22] Filed: Dec. 30, 1994

[51] Int. Cl.$^6$ .......................... G02B 15/14; G02B 13/04
[52] U.S. Cl. .......................... 359/679; 359/682; 359/751; 359/770
[58] Field of Search .................. 359/679, 682, 359/770, 774, 781, 783, 750, 751, 752, 753

[56] References Cited

U.S. PATENT DOCUMENTS

| | | | |
|---|---|---|---|
| 1,955,590 | 4/1934 | Lee | 359/752 |
| 2,645,155 | 7/1953 | Tronnier | 359/740 |
| 2,793,565 | 5/1957 | Zollner et al. | 359/740 |
| 2,923,203 | 2/1960 | Tronnier | 359/752 |
| 2,955,513 | 10/1960 | Tronnier | 359/752 |
| 2,969,713 | 1/1961 | Mukai | 359/751 |
| 3,468,600 | 9/1969 | Hugues | 359/752 |
| 3,551,030 | 12/1970 | Gilkeson et al. | 359/723 |
| 4,806,003 | 2/1989 | Mukai et al. | 359/750 |

*Primary Examiner*—Scott J. Sugarman
*Assistant Examiner*—Jordan M. Schwartz
*Attorney, Agent, or Firm*—Svetlana Z. Short

[57] ABSTRACT

An enlargement lens system with a large working distance comprising five lens components with a stop between the third and fourth components (numbered from the long conjugate side). It includes a first negative lens component, meniscus concave to the stop; a second positive lens component, having a convex surface toward the first lens component; a third and fourth lens component, both cemented negative doublets, meniscus concave to the stop; and a fifth positive power biconvex lens component, wherein BF/EF>1.0, where BF is the short conjugate back focus and EF is the focal length of the lens system.

9 Claims, 4 Drawing Sheets

ENLARGING LENS WITH A LARGE WORKING DISTANCE

BACKGROUND OF THE INVENTION

1. Field of the Invention

The present invention relates to finite conjugate lenses suitable as photographic objectives used for enlarging or projection printing. It is especially suited, but not limited, to applications requiring large magnification.

2. Description of the Prior Art

In designing well-corrected enlargement lens systems, it is desireable to provide a relatively large working distance (defined as the space behind the last lens surface in the short conjugate side). A large working distance facilitates placement of mirrors, filter wheels, film transport mechanism, etc. In typical enlarging lens systems, however, the back focus BF is usually shorter and often much shorter than the focal length EF of the lens system. This is usually not a problem with smaller magnification because the conjugates are both quite large. However, as magnification increases, the working distance approaches the back focus. Since in normal enlarging lens systems the BF/EF ratio usually falls between 0.5 to 0.9, at large magnifications such lens systems may not have an adequate working distance.

Although lens systems with BF/EF ratio larger than 1.0 exist (i.e., inverse telephoto lenses) they are usually not suitable as enlargement lenses because they are either not designed as a finite conjugate lens system or because they do not provide good corrections at large magnifications.

SUMMARY OF THE INVENTION

It is an object of the present invention to provide a new and improved enlargement lens having an expanded working distance and good corrections when used at a magnification of six or more.

According to the present invention, this and other objects are obtained by an enlargement lens system which comprises only five lens components with a stop between the third and fourth components (numbered from the long conjugate side). It includes a first negative lens component, meniscus concave to the stop; a second positive lens component, having a convex surface toward the first lens component; a third and fourth lens component, both cemented negative doublets, meniscus concave to the stop; and a fifth positive power biconvex lens component, wherein BF/EF>1.0, where BF is the short conjugate back focus and EF is the focal length of the lens system.

According to a preferred embodiment of the invention, the third lens component comprises, from the stop, a positive power lens element and a negative power lens element.

According to another preferred embodiment of the invention, the fourth lens component comprises, from the stop, a negative power lens element and a positive power lens element.

A lens constructed according to the preferred embodiments is well-corrected and has substantial working distance when used at high magnification, for example, 6 or more.

BRIEF DESCRIPTION OF THE DRAWINGS

In the detail description of preferred embodiments of the invention presented below, reference is made to the accompanying drawings in which.

DESCRIPTION OF THE PREFERRED EMBODIMENT

Figure 2:
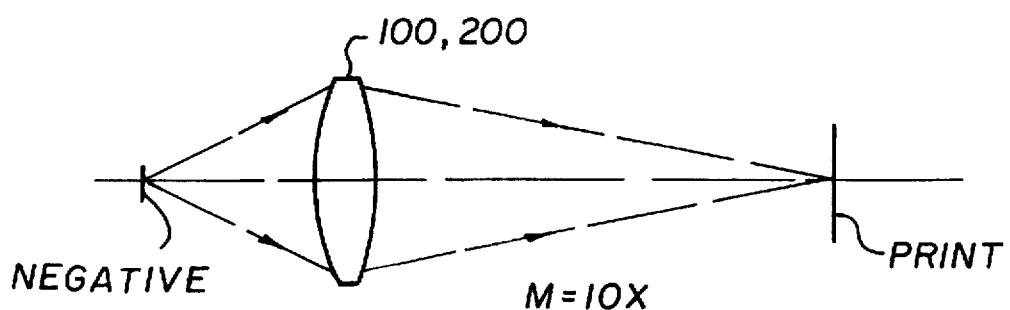
FIG. 2 is a schematic representation of a lens systems 100, 200 oriented opposite to that shown in FIG. 1. The magnification of the lens system is~10×.
Figure 3:
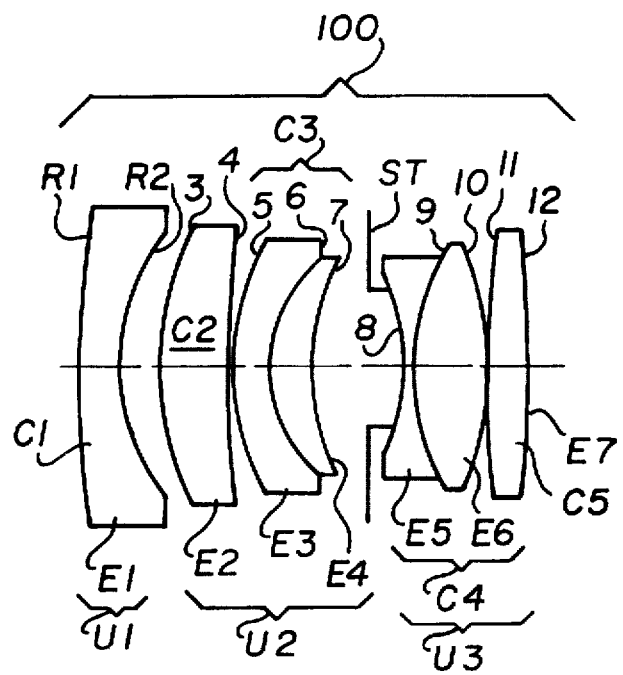
FIG. 3 is a schematic cross-sectional view of lens 100 constructed according to a first preferred embodiment of the present invention.

The enlargement lens 100 of a first preferred embodiment is illustrated in FIG. 3. This enlargement lens was designed for use in a printer as a printer lens and is well-corrected at more than 6× magnification. More specifically, it will be used at 10.66× magnification, when the negative is placed at the short conjugate side and the print is placed at the long conjugate side (FIG. 2). However, the lens 100 of this embodiment and the lens 200 of the second embodiment are both designed and analyzed from the long to short conjugate sides (FIG. 1) and thus have magnification $$m = \left( \frac{1}{10.66} \right).$$

Figure 1:
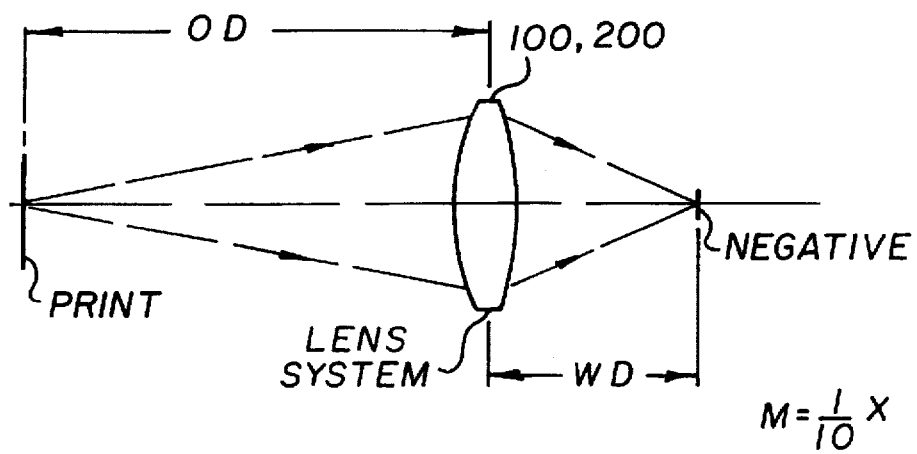
FIG. 1 is a schematic representation of an enlargement lens systems 100, 200 as it was designed. In this orientation the magnification is~1/10×.

Therefore, the lens 100 is modeled as shown in FIG. 1. It has a semi-field (½ field angle) of 16.98 degrees, a focal length EF of 44.69 mm an f-number F/4.2, and a back focus BF when the object is at infinity of 44.93 mm. At $$m = \left( \frac{1}{10.66} \right) X,$$

the object distance OD is 497.77 mm and the image distance or working distance WD is 49.12 mm. That is, $$WD = (EF*m) + BF = \left( \frac{44.5}{10.66} + 44.94 \right) = 49.12.$$

Thus, because the working distance WD is large, the enlargement lens system provides enough space between the last lens surface and the image plane negative (FIG. 1) for other optical elements such as mirrors, prisms, filters, etc.

The lens system 100 comprises 5 lens components and a total of seven lens elements organized into three lens units U1, U2 and U3. An aperture stop ST is located between a second lens unit U2 and a third lens unit U3. Following from a print to a negative as shown in FIG. 1 (i.e. from the long to the short conjugate side), the enlargement lens system 100 comprises:

1) a first, negative lens unit U1 which is a first lens component C1, the first lens component C1 being a negative power lens element E1 of a meniscus shape having a convex print side surface with a radius of curvature R1 and a concave negative side surface with a radius of curvature R2, where R2<R1;

2) a second positive power lens unit U2 air spaced from said first lens unit U1. The second lens unit U2 comprises a second lens component C2 and a third lens component C3. The second lens component C2 is a positive power meniscus lens component having a convex object side surface. It corresponds to lens element E2. The third lens component C3 has negative power and is also meniscus in shape. The lens component C3 has a convex print side surface and a concave negative side surface facing an aperture stop. This third lens component is a cemented doublet—it is a negative meniscus shape lens element E3 cemented to a positive power meniscus lens element E4;

3) the aperture stop ST; and 4) a third positive power lens unit U3 comprising fourth lens component C4 having a concave print side surface facing the aperture stop and a convex negative side surface, the fourth lens component C4 being a cemented doublet; and a fifth positive power biconvex lens component C5. The fourth lens component C4 comprises a biconcave negative lens element E5 cemented to a positive biconvex lens element E6. The positive bicovex lens component C5 is a single lens element or singlet E7.

Figure 4:
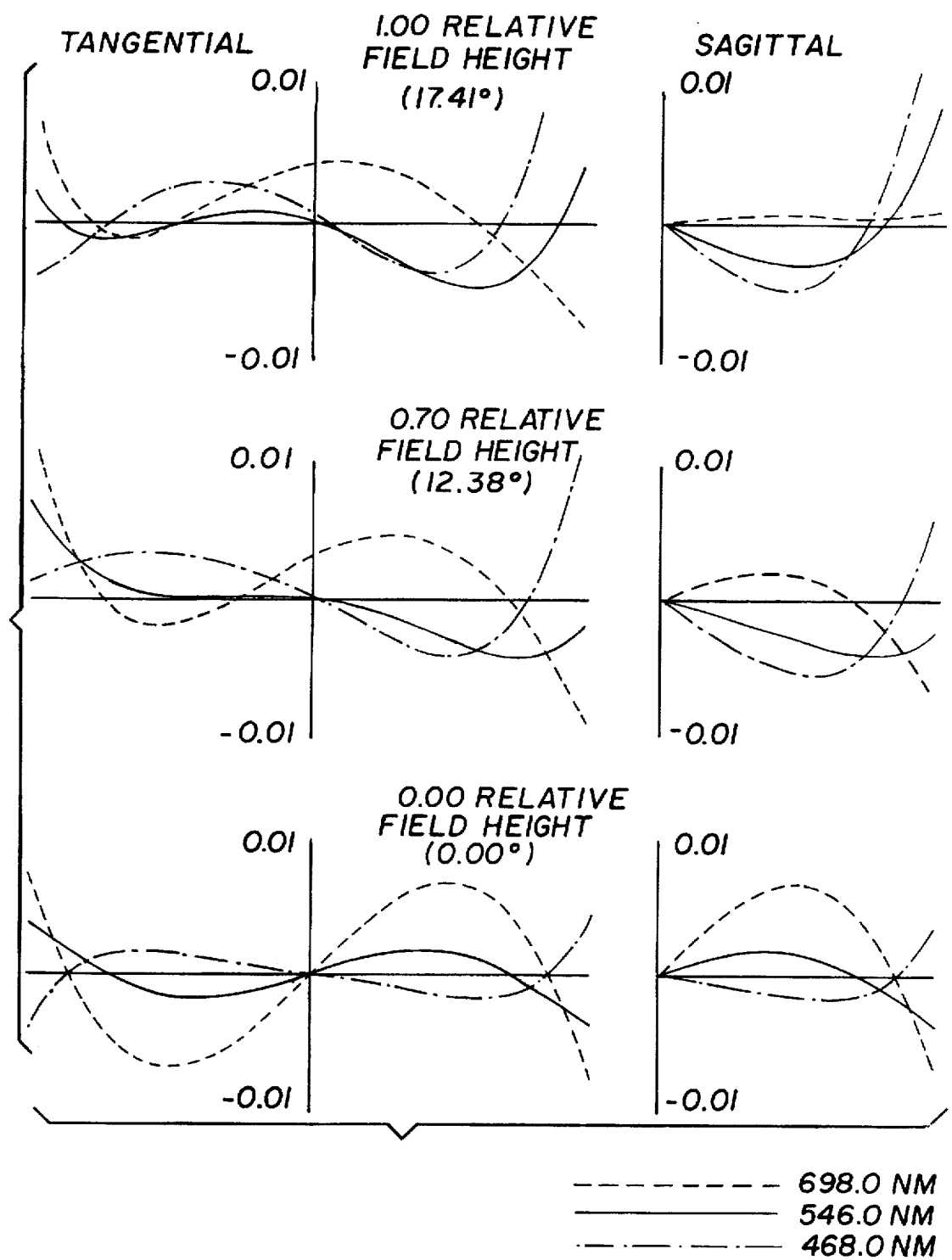
FIG. 4 shows curves illustrating aberration characteristics of the lens 100.
Figure 6:
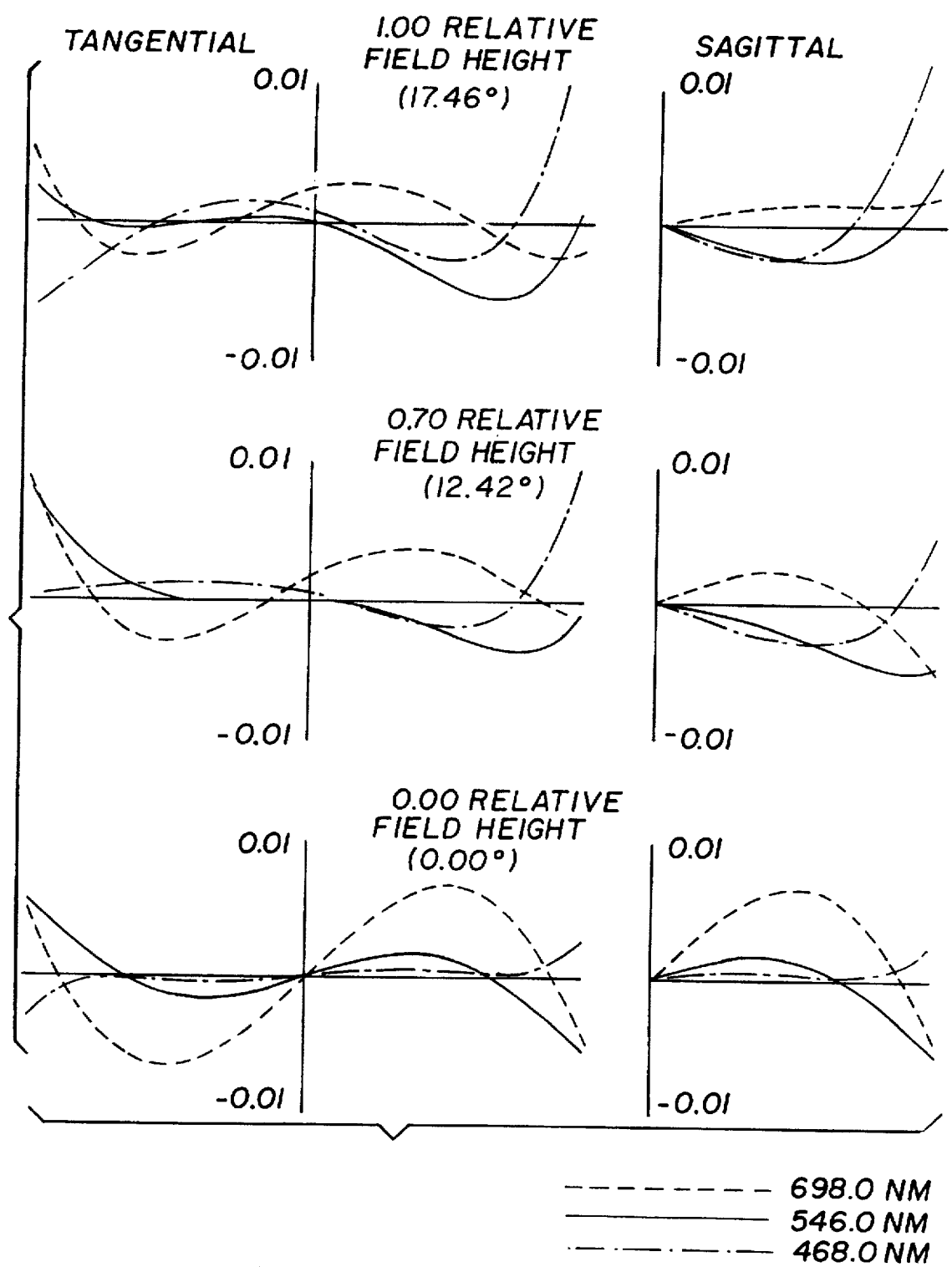
FIG. 6 shows curves illustrating aberration characteristics of the lens 200.

The lens system satisfies the following equations:

$$BF/EF > 1.0 \quad (1)$$

$$1/m > 6 \quad (2)$$

$$V3/V4 < 1 \quad (3)$$

where BF is a back focus (for an object at infinity) and EF is the focal length of the lens system, m is the inverse of the enlarging magnification. V3 is the Abbe number of the negative, print side lens element E3 of the cemented doublet component C3 located directly in front of the aperture stop and V4 is the Abbe number of the positive, negative side lens element E4 of the cemented doublet. FIG. 4 shows curves illustrating aberration characteristics of the lens 100.

The numerical data for the lens 100 is as follows:

TABLE 1

| Surface | Clear Aper. | Radius | Thickness | Index | V Number |
|---|---|---|---|---|---|
| 1 | 19.06 | 58.2268 | 2.478 | 1.517 | 64.2 |
| 2 | 16.91 | 15.4914 | 3.000 | | |
| 3 | 16.62 | 20.9492 | 4.063 | 1.735 | 41.6 |
| 4 | 15.43 | 78.3486 | 0.200 | | |
| 5 | 14.56 | 17.5736 | 2.000 | 1.613 | 44.3 |
| 6 | 12.33 | 8.49960 | 3.450 | 1.620 | 63.5 |
| 7 | 10.91 | 13.7542 | 3.505 | | |
| | 9.36 | Diaphragm | 2.075 | | |
| 8 | 10.23 | −14.5565 | 1.009 | 1.613 | 44.3 |
| 9 | 12.70 | 15.8029 | 4.579 | 1.620 | 63.5 |
| 10 | 13.92 | −15.8029 | 0.211 | | |
| 11 | 15.26 | 81.6700 | 2.502 | 1.620 | 60.3 |
| 12 | 15.71 | −52.5273 | | | |

LENS LENGTH 29.971
PTZ SUM (F/100) = 0.001329

1. The MTF responses in the table below are computed for the wavelengths 698, 546, and 468 with equal weights. AWA is area weighted average MTF.

| | | Field (Sagittal/Tangential) | | | | | | |
|---|---|---|---|---|---|---|---|---|
| L/MM | AXIS | 40% | 60% | 75% | 90% | AWA | 100% |
| 53.3 | 64 | 71/69 | 70/70 | 69/68 | 68/65 | 68.6 | 64/60 |

At the maximum field, the distortion is −2.0%.

2.

| Image Height | Angular Field | Approx. Rel Illum. (Image) | Max. Aper. With No Vignetting |
|---|---|---|---|
| 5.21 | 6.03 | 0.99 | F/ 4.2 |
| 10.46 | 12.07 | 0.96 | F/ 4.2 |
| 14.78 | 16.98 | 0.92 | F/ 4.2 |

| Pupil | Location | Diameter |
|---|---|---|
| Ent. | 14.95 | 10.50 |
| Exit | −9.99 | 12.90 |

Figure 5:
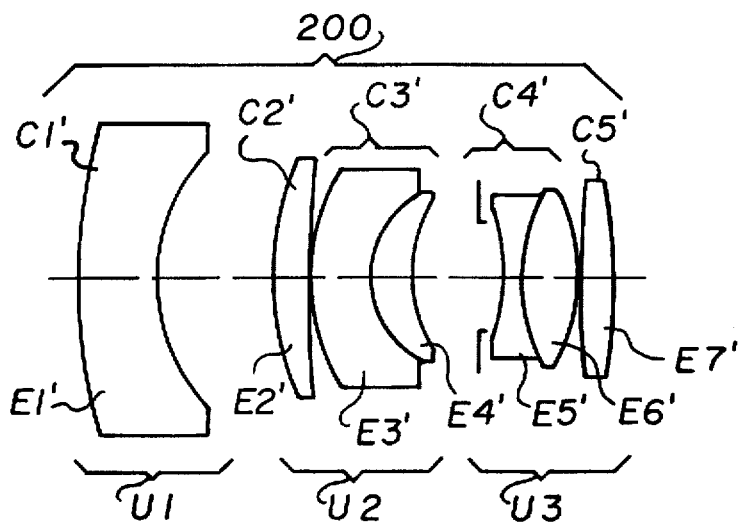
FIG. 5 is a schematic cross-sectional view of a lens 200 constructed according to a second preferred embodiment of the present invention.

The enlargement lens 200 of a second preferred embodiment is illustrated in FIG. 5. The lens system 200 is similar to the lens system 100 of the first preferred embodiment. The enlargement lens system 200 was also designed for use in a printer as a printer lens and also provides a 10.66× magnification. When analyzed from a long to a short conjugate side (i.e., print side to negative side), it works with a semi-field (½ field angle) of 16.98 degrees, has a focal length EF of 44.53 mm, an f-number F/4.2, and a back focus BF (when an object is at infinity) of 44.94 mm. The object distance is 486.12 mm and the image distance or working distance WD is (i.e., the distance from the print to the lens) 49.11 mm. Thus the enlargement lens system 200 provides ample space between the last lens surface and the image plane for other optical elements such as mirrors, prisms, filters, etc.

The lens system 200 also comprises 5 lens components and a total of seven lens elements organized into three lens units U1, U2 and U3. An aperture stop ST is located between a second lens unit U2 and a third lens unit U3. Following from the long to the short conjugate side, the enlargement lens system 200 comprises:

1) a first, negative lens unit U1 which is a first lens component C1', the first lens component C1' being a negative power lens element E1' of a meniscus shape having a convex print side surface with a radius of curvature R1' and a concave negative side surface with a radius of curvature R2', where R2'<R1';

2) a second positive power lens unit U2 air spaced from said first lens unit U1. The second lens unit U2 comprises a second lens component C2' and a third lens component C3'. The second lens component C2' is a positive power meniscus lens component having a convex print side surface. The third lens component C3' has negative power and is also meniscus in shape. The lens component C3' has a convex print side surface and a concave negative side surface facing an aperture stop. This third lens component is a cemented doublet—it is a negative meniscus shape lens element E4' cemented to a positive power meniscus lens element E5';

3) the aperture stop ST'; and 4) a third positive power lens unit U3 comprising fourth lens component C4" having a concave negative side surface facing the aperture stop and a convex negative side surface, the fourth lens component C4' being a cemented doublet; and a fifth positive power biconvex lens component C5'. The fourth lens component C4' comprises a biconcave negative lens element E5' cemented to a positive biconvex lens element E6'. The positive biconvex lens component C5' is a single lens element or singlet E7'.

The lens system satisfies the following equations:

$BF/EF > 1.0$                          (1)

$1/m > 6$                                (2)

$V3/V4 < 1$                            (3)

where BF is a back focus when the object is at infinity and EF is the focal length of the lens system, m is the enlarging magnification. V3 is the Abbe number of the negative, object side lens element E3' of the cemented doublet component C3' located directly in front of the aperture stop ST' and V4 is the Abbe number of the positive, image side lens element E4' of the cemented doublet. FIG. 4 shows curves illustrating aberration characteristics of the lens system 200.

The numerical data for the lens system 200 is as follows:

TABLE 2

| Surface | Clear Aper. | Radius | Thickness | Index | V Number |
|---|---|---|---|---|---|
| 1 | 24.75 | 50.7879 | 6.280 | 1.517 | 64.2 |
| 2 | 20.22 | 17.7473 | 8.625 | | |
| 3 | 18.83 | 25.9230 | 2.650 | 1.735 | 41.6 |
| 4 | 18.26 | 95.5660 | 0.202 | | |
| 5 | 17.19 | 19.9150 | 4.710 | 1.620 | 36.4 |
| 6 | 13.03 | 9.01020 | 2.916 | 1.618 | 55.1 |
| 7 | 11.94 | 14.0564 | 5.194 | | |
| | 9.50 | Diaphragm | 1.967 | | |
| 8 | 10.36 | −16.7129 | 1.300 | 1.613 | 44.3 |
| 9 | 12.69 | 18.3042 | 4.128 | 1.620 | 63.5 |
| 10 | 13.85 | −18.3042 | 0.200 | | |
| 11 | 15.06 | 88.4664 | 2.560 | 1.620 | 60.3 |
| 12 | 15.54 | −43.6405 | | | |

LENS LENGTH 40.731
PTZ SUM (F/100) = 0.001211

1. The MTF responses in the table below are computed for the wavelengths 698, 546, and 468 with equal weights. AWA is area weighted average MTF.

| | | Field (Sagittal/Tangential) | | | | | |
|---|---|---|---|---|---|---|---|
| L/MM | AXIS | 40% | 60% | 75% | 90% | AWA | 100% |
| 53.3 | 66 | 72/70 | 72/72 | 71/72 | 72/71 | 70.7 | 70/67 |

2.

| Image Height | Angular Field | Approx. Rel Illum. (Image) | Max. Aper. With No Vignetting |
|---|---|---|---|
| 5.21 | 6.03 | 0.99 | F/ 4.2 |
| 10.46 | 12.07 | 0.96 | F/ 4.2 |
| 14.79 | 16.98 | 0.92 | F/ 4.2 |

| Pupil | Location | Diameter |
|---|---|---|
| Ent. | 24.97 | 10.47 |
| Exit | −9.52 | 12.81 |

Although in the preferred embodiments the lens element's surfaces are spherical, in a modification aspherical surfaces can be used.

The invention has been described in detail with particular reference to a preferred embodiment thereof, but it will be understood that variations and modifications can be effected within the spirit and scope of the invention.

What is claimed is:

1. A lens system consisting of the following seven lens elements numbered successively from a long conjugate to a short conjugate with the stop between the fourth and the fifth lens elements:

a) a first, negative power lens element, meniscus concave to the stop;

b) a second, positive power lens element having a convex surface toward the first lens element;

c) a third, negative power lens element;

d) a fourth, positive power lens element having a concave surface oriented towards the aperture stop;

e) a fifth, negative power lens element;

f) a sixth, positive power lens element having a convex side facing a seventh lens element; and g) the seventh, positive power biconvex lens element; and wherein BF/EF>1.0, where BF is a back focus and EF is the focal length of the lens system.

2. A lens system according to claim 1 having the following parameters:

| Surface | Clear Aper. | Radius | Thickness | Index | V Number |
|---|---|---|---|---|---|
| 1 | 19.06 | 58.2268 | 2.478 | 1.517 | 64.2 |
| 2 | 16.91 | 15.4914 | 3.000 | | |
| 3 | 16.62 | 20.9492 | 4.063 | 1.735 | 41.6 |
| 4 | 15.43 | 78.3486 | 0.200 | | |
| 5 | 14.56 | 17.5736 | 2.000 | 1.613 | 44.3 |
| 6 | 12.33 | 8.49960 | 3.450 | 1.620 | 63.5 |
| 7 | 10.91 | 13.7542 | 3.505 | | |
| | 9.36 | Diaphragm | 2.075 | | |
| 8 | 10.23 | −14.5565 | 1.009 | 1.613 | 44.3 |
| 9 | 12.70 | 15.8029 | 4.579 | 1.620 | 63.5 |
| 10 | 13.92 | −15.8029 | 0.211 | | |
| 11 | 15.26 | 81.6700 | 2.502 | 1.620 | 60.3 |
| 12 | 15.71 | −52.5273 | | | |

3. A lens system according to claim 1 having the following parameters:

| Surface | Clear Aper. | Radius | Thickness | Index | V Number |
|---|---|---|---|---|---|
| 1 | 24.75 | 50.7879 | 6.280 | 1.517 | 64.2 |
| 2 | 20.22 | 17.7473 | 8.625 | | |
| 3 | 18.83 | 25.9230 | 2.650 | 1.735 | 41.6 |
| 4 | 18.26 | 95.5660 | 0.202 | | |
| 5 | 17.19 | 19.9150 | 4.710 | 1.620 | 36.4 |
| 6 | 13.03 | 9.01020 | 2.916 | 1.618 | 55.1 |
| 7 | 11.94 | 14.0564 | 5.194 | | |
| | 9.50 | Diaphragm | 1.967 | | |
| 8 | 10.36 | −16.7129 | 1.300 | 1.613 | 44.3 |
| 9 | 12.69 | 18.3042 | 4.128 | 1.620 | 63.5 |
| 10 | 13.85 | −18.3042 | 0.200 | | |
| 11 | 15.06 | 88.4664 | 2.560 | 1.620 | 60.3 |
| 12 | 15.54 | −43.6405 | | | |

4. A lens system according to claim 1, wherein said third, negative power lens element is cemented to said fourth, positive power lens element.

5. A lens system according to claim 1, wherein said fifth, negative power lens element is cemented to said sixth, positive power lens element.

6. A lens system according to claim 1, wherein said third, negative power lens element is cemented to said fourth, positive power lens element thus forming a first cemented component and said fifth, negative power lens element is cemented to said sixth, positive power lens element thus forming a second cemented component.

7. A lens system according to claim 6, wherein said first and said second cemented components each have a negative power.

8. A lens system according to claim 1, wherein $1/m > 6$ and $V_3 < V_4$, where m is the inverse of the enlarging magnification, $V_3$ is the Abbe V number of the third, negative lens element and $V_4$ is the Abbe V number of the fourth, positive lens element.

9. A lens system according to claim 7, wherein $1/m > 6$ and $V_3 < V_4$, where m is the inverse of the enlarging magnification, $V_3$ is the Abbe V number of the third, negative lens element and $V_4$ is the Abbe V number of the fourth, positive lens element.

* * * * *